L. F. N. BALDWIN.
TIDE WATER POWER APPARATUS.
APPLICATION FILED JAN. 23, 1915. RENEWED SEPT. 14, 1917.
1,261,472.
Patented Apr. 2, 1918.
3 SHEETS—SHEET 1.
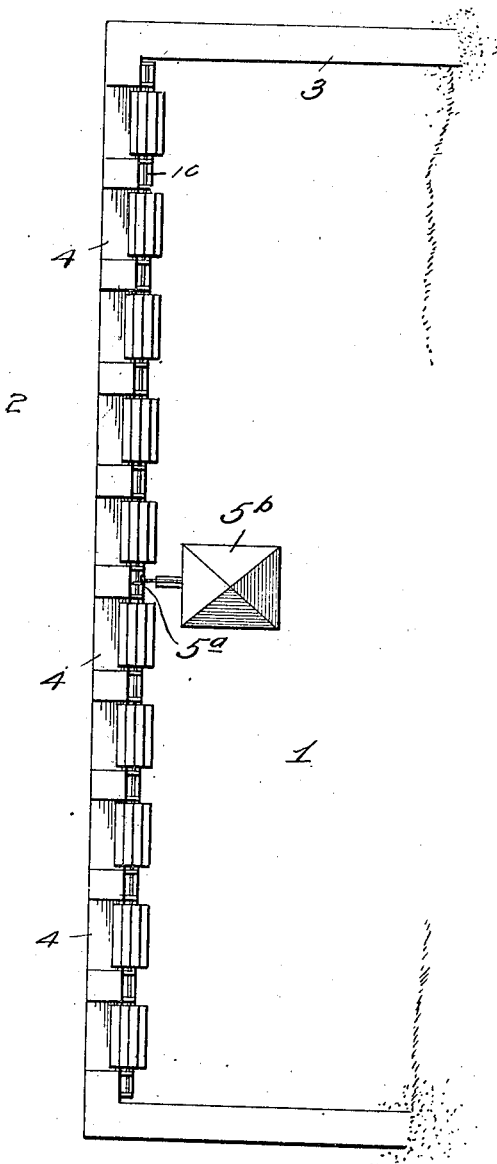
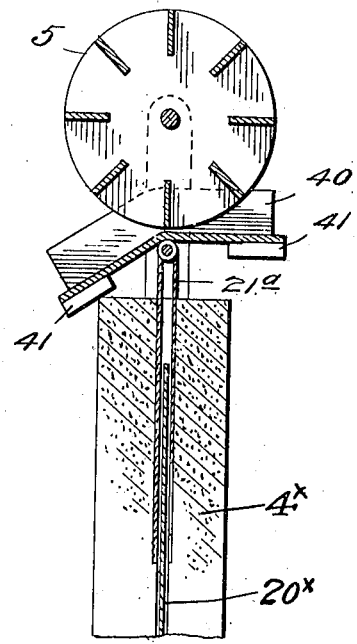

L. F. N. BALDWIN.
TIDE WATER POWER APPARATUS.
APPLICATION FILED JAN. 23, 1915. RENEWED SEPT. 14, 1917.

1,261,472.

Patented Apr. 2, 1918.
3 SHEETS—SHEET 2.

L. F. N. BALDWIN.
TIDE WATER POWER APPARATUS.
APPLICATION FILED JAN. 23, 1915. RENEWED SEPT. 14, 1917.
1,261,472.
Patented Apr. 2, 1918.
3 SHEETS—SHEET 3.
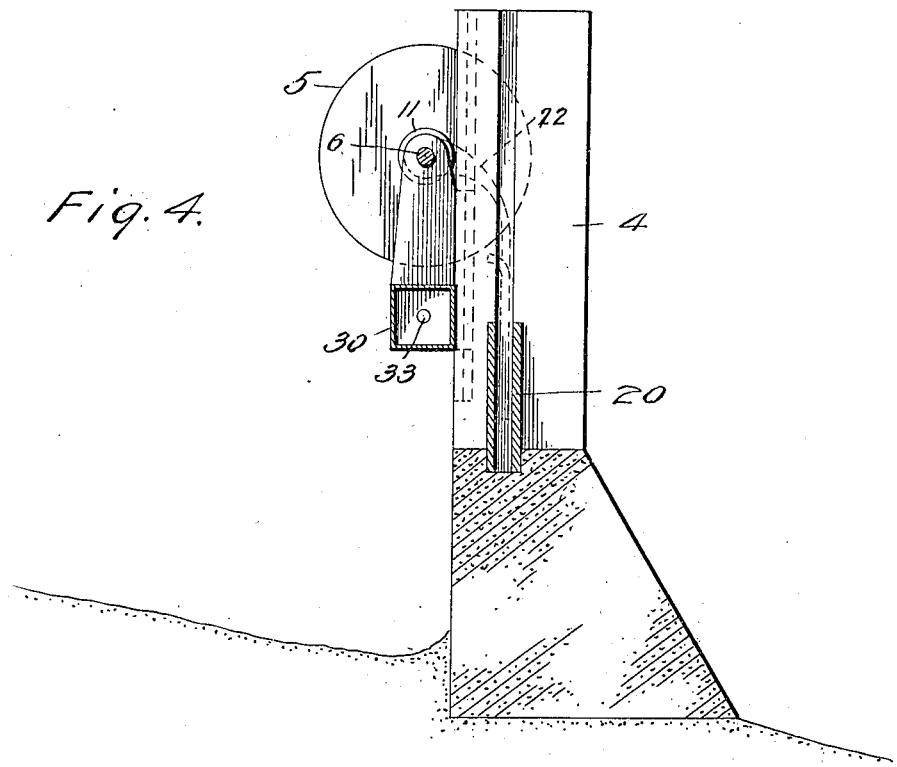
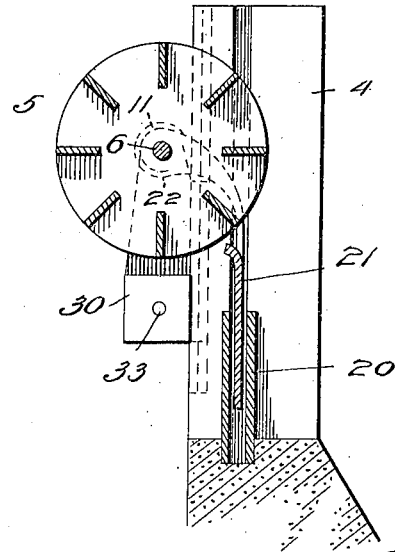

UNITED STATES PATENT OFFICE.

LEON F. N. BALDWIN, OF PROVIDENCE, RHODE ISLAND.

TIDE-WATER-POWER APPARATUS.

1,261,472.  Specification of Letters Patent.  Patented Apr. 2, 1918.

Application filed January 23, 1915, Serial No. 4,055. Renewed September 14, 1917. Serial No. 191,504.

*To all whom it may concern:*

Be it known that I, LEON F. N. BALDWIN, citizen of the United States, residing at Providence, in the county of Providence and State of Rhode Island, have invented new and useful Improvements in Tide - Water-Power Apparatus, of which the following is a specification.

My present invention pertains to the utilization of natural power; and it seeks to make use of the passage of tide water from a body of water, the ocean for instance, into a reservoir and vice versa. The power thus obtained may be used for any purpose to which it is applicable without involving departure from the scope of my claimed invention, though I prefer to employ it in the generation of electricity.

With the foregoing in mind, the invention will be fully understood from the following description and claims when the same are read in connection with the drawings, accompanying and forming part of this specification, in which:

Figure 1 is a general plan of the appartus that I prefer to employ in the practice of my invention.

Fig. 4 is a vertical section taken through one of the floats and the shaft in a plane at one side of the water wheel.

Fig. 5 is a vertical transverse section taken through the water wheel and illustrating the telescopic gate complementary to the wheel and also illustrating one of the floats in end elevation.

Fig. 6 is a vertical section taken through a water wheel and appurtenances of modified construction, the same to be hereinafter specifically referred to.

Similar numerals of reference designate corresponding parts in Figs. 1 to 5, of the drawings.

Figure 2:
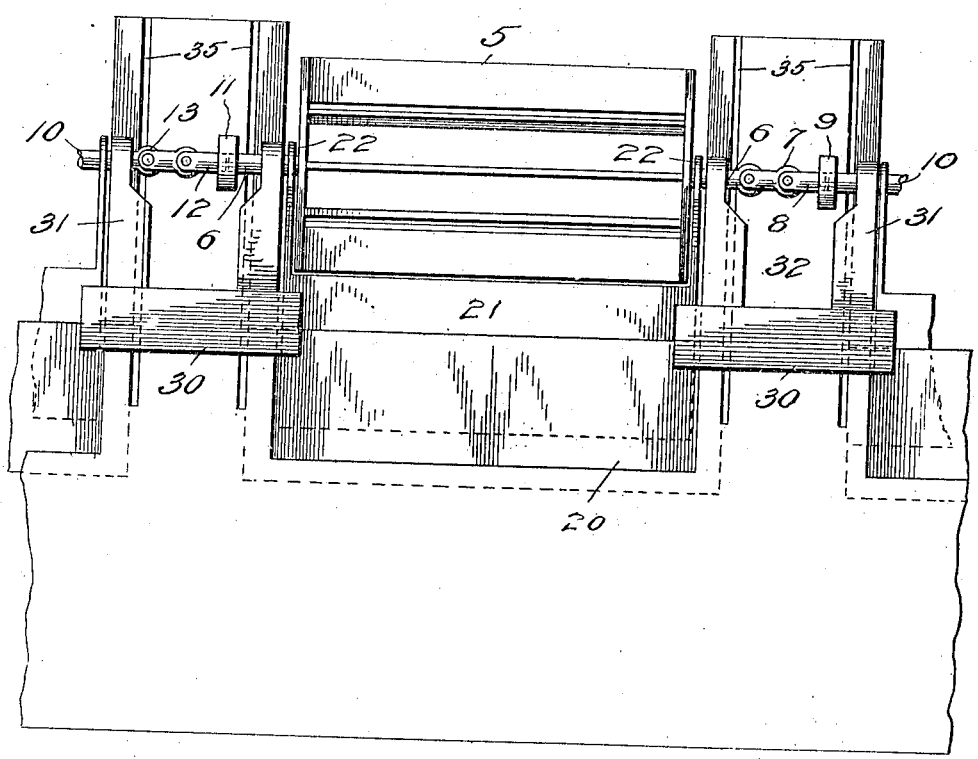
Fig. 2 is a front elevation, on an enlarged scale, illustrating one of the water wheels embodied in the apparatus and the elements appurtenant thereto.

In furtherance of my invention, I provide a reservoir 1, Fig. 1, which is formed and separated from the ocean or other body of tide water 2 by a wall 3, formed of cement or other material compatible with my invention. The said wall comprises end portions and a front portion, and in the latter at intervals in the length thereof are suitably provided openings 4 in each of which is disposed a water wheel 5. These water wheels may be of any type suitable to the purpose of my invention, though I prefer that they should be of the undershot kind illustrated for reasons hereinafter set forth. The several water wheels 5 are connected together in series by a sectional shaft hereinafter specifically referred to, and the said shaft may be and preferably is connected at 5ª in Fig. 1 to an electric generator, located in a building 5ᵇ, Fig. 1, disposed and suitably supported in the reservoir 1. The electric generator *per se* may be of conventional or any other approved construction, and as it forms no part of my invention I have deemed it unnecessary to illustrate the same.

Figure 3:
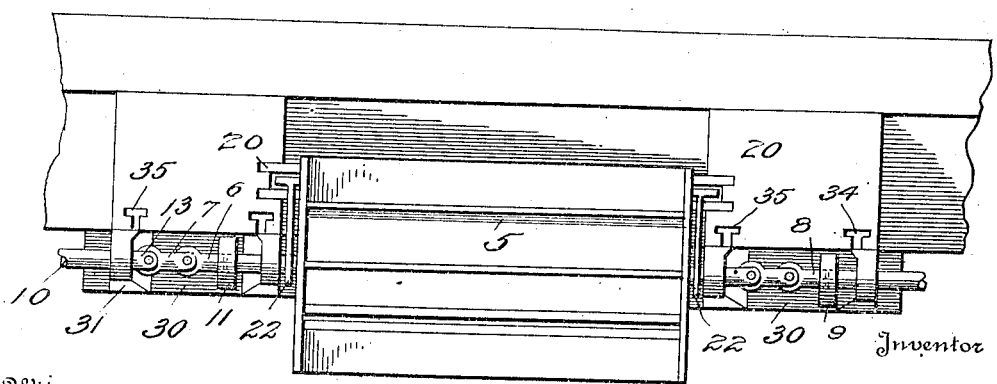
Fig. 3 is a top plan of the same.

The undershot wheels 5 and the manner of connecting the same with the shaft as well as the manner of controlling the passage of water beneath the wheels are identical, and therefore a detailed description of the wheel shown in Figs. 2 to 5 and the elements that coöperate with the said wheel will suffice to impart a definite understanding of all of the wheels and the appurtenances thereof. By reference to Figs. 2 and 3 it will be manifest that the wheel 5 therein illustrated is fast upon a shaft section 6. At one end the shaft section 6 is connected through universal joints 7 with a short shaft section 8. This short shaft section 8 is connected at 9 to a suitable clutch through the medium of which it is designed to be connected with and disconnected from a shaft section 10 that extends to and is detachably connected with the shaft 6 of the next adjacent water wheel 5. At its end opposite to the one just referred to, the shaft section 6 is detachably connected through a clutch 11 with a short shaft section 12, and the latter is connected through universal joints 13 with a shaft section 10 connected with the shaft 6 of the next water wheel on the left, and corresponding to the shaft section 10 shown at the right of Fig. 2. The clutches 9 and 11 may be of any suitable construction, and I have elected not to show the same in detail inasmuch as their purpose is to permit of some of the water wheels being rendered idle without affecting the operation of other wheels. In this connection, I would say that my invention is not restricted to taking power for the generator from a single point in the length of the wheel shaft, but on the other hand power may be taken from the shaft at different points in the length thereof, this in order to provide against rendering idle any of the wheels except the one that it is desired to put out of use.

The universal joints are provided in the shaft at opposite sides of each wheel in order to enable the wheel to accommodate itself to a wave or waves that do not affect to the same extent the other wheels in the series, which series may be of any length according to the power that is to be developed.

Suitably connected with the front wall of the reservoir at the bottom of the opening 4 therein is the lower member 20 of a telescopic gate, which gate extends the full width of the said opening. In addition to the lower member 20, the telescopic gate comprises a vertically-movable member 21. This latter extends upwardly to a point closely adjacent the perimeter of the wheel 5, and is provided with arms 22, Figs. 2 and 3 which are hung on and loosely receive the shaft sections 6 at the ends of the water wheel. From this it follows that when the wheel 5 moves upwardly or downwardly, the gate section 21 will follow the wheel with the result that water in passing through the openings 4 is compelled to act against the wheel in order to get past the same, and this irrespective of whether the water is moving from the ocean into the reservoir or from the reservoir back into the ocean.

In order to maintain the wheel 5 and its complementary gate section 21 in the proper position relative to the stage of the water, I provide floats 30 which are guided against the face or inner side of the front portion of the wall 3 and are connected through suspension arms 31 with the wheel shaft. In the preferred embodiment of my invention, the said floats 30 are made of steel and are hollow in form. I would also have it understood that the floats are provided at 32 with filling apertures, normally closed by caps 33 or other closure devices suitable to the purpose. By virtue of this provision the floats can be partially filled with water or can be pumped or otherwise cleared of water for the purpose of lining up and disposing all the floats at practically the same height. When deemed necessary or desirable the floats 30 may be provided with headed guide projections 34 disposed in correspondingly shaped ways 35 in the front portion of the wall 3, this in order to enable the floats to move upwardly and downwardly while holding them rigidly against movement in other directions.

It will be gathered from the foregoing that in the event that the water in the ocean is one foot or eighteen inches higher than the water in the reservoir, the water cannot pass from the ocean into the reservoir without turning the wheels. Again when the water passes from the reservoir into the ocean following the dropping of the water level in the ocean below that in the reservoir, the wheels will be turned in reverse direction. In this connection, I would say that any conventional means may be employed for compensating for the rotation of the shaft in the reverse direction alluded to.

It will also be gathered from the foregoing that the wheels will practically be idle only at flood tide, and that the wheels will be actuated approximately twenty hours out of every twenty-four.

When deemed necessary each of the wheels may be located in a chute 40 such as shown in Fig. 6. The said chute is pivotally mounted at the upper end of a vertically movable gate section 21$^a$ and is provided at its ends with floats or other suitable buoyant devices 41. One of the said floats is disposed in the reservoir and the other in the ocean, and from this it follows that when the level of the water in the ocean is above the level of the water in the reservoir, the end of the chute adjacent the ocean will be raised, and water will be chuted from the ocean and past the wheel in such manner as to actuate the latter and into the reservoir. On the other hand when the level of the water in the reservoir is above that in the ocean, the end of the chute in the reservoir will be raised, and water will be chuted from the reservoir past the wheel so as to turn the same and into the ocean.

In the embodiment shown in Fig. 6, the lower gate section 20$^x$ is fixed in the wall 4$^x$, and the upper gate section 21$^a$ is arranged to move on and with respect to the section 20$^x$ and in suitable guideways provided in the wall 4$^x$.

While I have specifically described one form of apparatus for the purpose of the practice of my invention, I desire it distinctly understood that I do not confine myself to the said specific construction, inasmuch as in the future practice of the invention such changes or modifications may be made as do not involve departure from the scope of my invention as claimed.

Having described my invention, what I claim and desire to secure by Letters Patent, is:

1. In an apparatus for the purpose described, a wall separating a reservoir from a body of tide water; said wall having a plurality of passages therethrough for water, water wheels disposed in the passages and each having shaft sections at its ends, connections interposed between the shaft sections and adjoining wheels and each comprising a universal joint and a clutch, and buoyant means complementary to and independently supporting the shaft sections of each wheel and connected with said shaft sections thereof.

2. In an apparatus for the purpose described, a wall separating a reservoir from a body of tide water; said wall having a plurality of passages therethrough for water, water wheels disposed in the passages and each having shaft sections at its ends, connections interposed between the shaft sections of adjoining wheels and each comprising a universal joint for permitting vertical movement of each wheel without affecting the other wheels, and buoyant means complementary to and supporting the shaft sections of each wheel and connected with said shaft sections thereof.

3. In an apparatus for the purpose described, a wall separating a reservoir from a body of tide water and having a passage therethrough for water, an undershot water wheel disposed and movable vertically in said passage, a telescopic gate disposed in the passage and having a section connected and movable vertically with the water wheel, and a chute in which the lower portion of the wheel is disposed, said chute being pivotally mounted at the upper end of said gate section and having floats at its ends.

In testimony whereof I have hereunto set my hand in presence of two subscribing witnesses.

LEON F. N. BALDWIN.

Witnesses:
 MARY V. MURPHY,
 PHILIP V. MARCUS.

Copies of this patent may be obtained for five cents each, by addressing the "Commissioner of Patents, Washington, D. C."